United States Patent [19]
Keller

[11] 3,757,414
[45] Sept. 11, 1973

[54] METHOD FOR BATCH FABRICATING SEMICONDUCTOR DEVICES

[75] Inventor: Hans W. Keller, Excelsior, Minn.

[73] Assignee: Honeywell Inc., Minneapolis, Minn.

[22] Filed: Mar. 26, 1971

[21] Appl. No.: 128,420

[52] U.S. Cl. .................................................. 29/580
[51] Int. Cl. ............................................ B01j 17/00
[58] Field of Search ..................... 29/580, 583, 589, 29/576 S

[56] References Cited
UNITED STATES PATENTS

| | | | |
|---|---|---|---|
| 2,846,626 | 8/1958 | Nowak | 29/583 |
| 2,944,321 | 7/1960 | Westberg | 29/580 |
| 3,224,069 | 12/1965 | Thorne | 29/580 |
| 3,427,708 | 2/1969 | Schutze et al. | 29/580 |

Primary Examiner—Charles W. Lanham
Assistant Examiner—W. Tupman
Attorney—Lamont B. Koontz and Omund R. Dahle

[57] ABSTRACT

A method for batch fabricating semiconductor stress sensors having the semiconductor material diaphragm rigidly joined to a support flange made of the same semiconducting material. Two processed silicon slices, one to form diaphragms and the other to form support flanges, are rigidly joined. The joined slices are then partitioned to form individual stress sensors.

16 Claims, 10 Drawing Figures

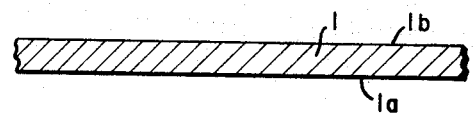
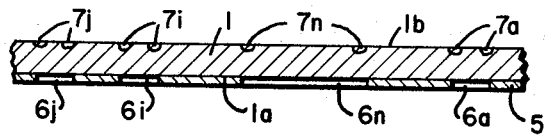
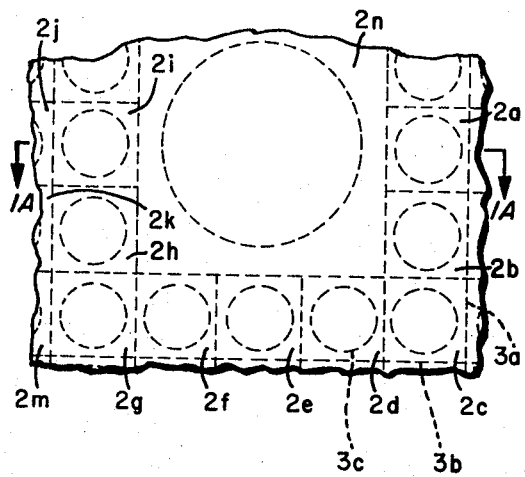
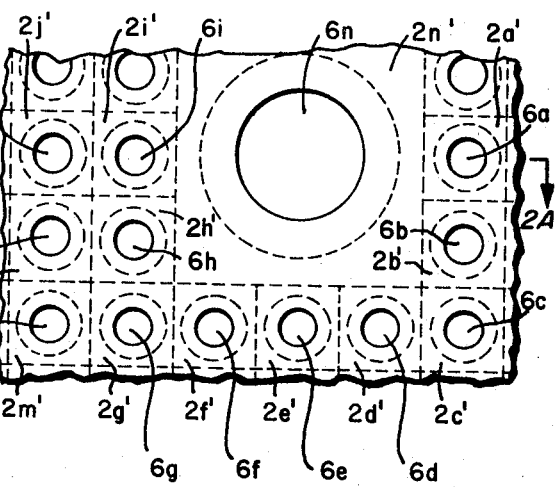
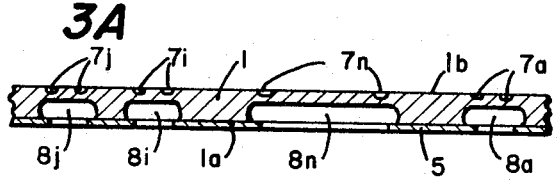
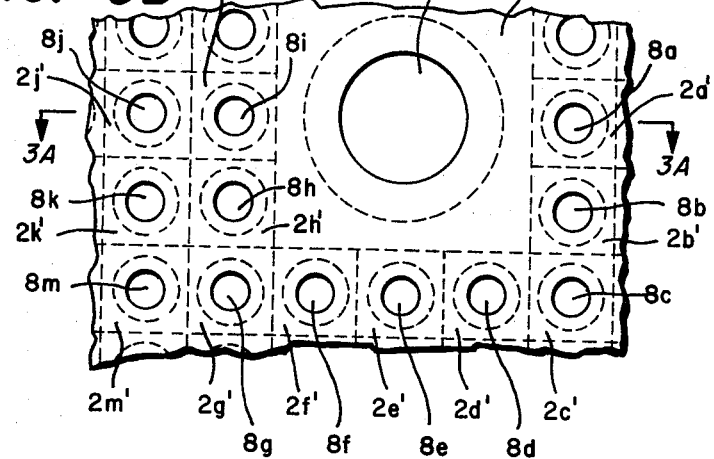
INVENTOR.
HANS W. KELLER

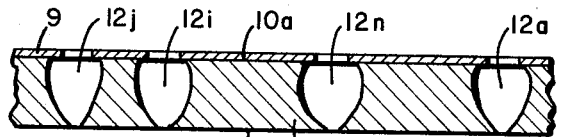
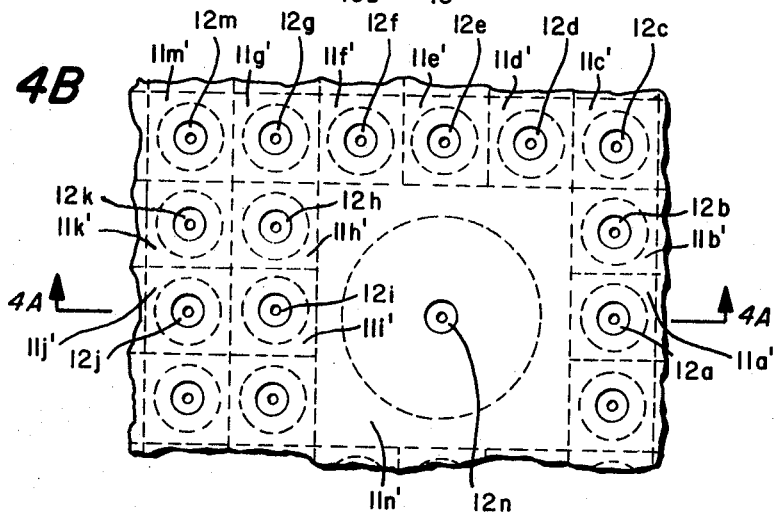
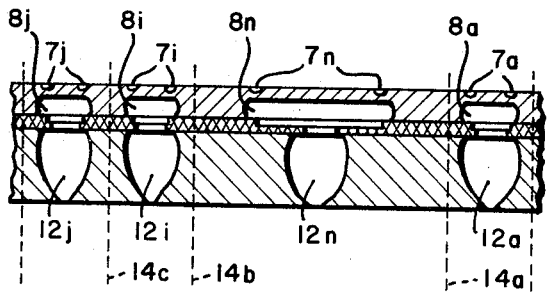
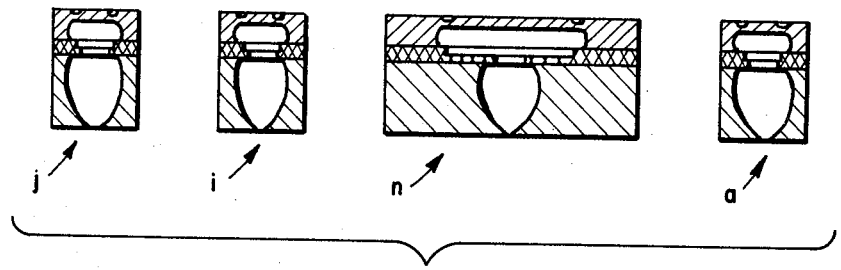

METHOD FOR BATCH FABRICATING SEMICONDUCTOR DEVICES

BACKGROUND OF THE INVENTION

Direct stress sensing by semiconductor elements has evolved recently. The element as originally introduced was a small piece of a semiconductor wafer serving as a diaphragm with electrical elements formed therein. This semiconductor diaphragm was then bonded to or mechanically coupled to a support structure which restricted motion of the periphery of the diaphragm with respect to its support structure, i.e., constrained the diaphragm by a peripheral surface in one of the diaphragm faces. However, poor bonding and differences between the thermal coefficients of expansion of the semiconductor material and the support structure material limited the accuracy of the composite structure as a stress sensor due to error stresses resulting from these coefficient differences.

It has been previously proposed that the support structure be made of the same material as the semiconductor diaphragm. Thus, the temperature coefficients of expansion in the semiconductor diaphragm and in the support structure would be equal. A method of making a stress sensor unit wherein the semiconductor diaphragm and the support flange are a single material unitary body is presented in U.S. Pat. No. 3,417,361 to H. B. Heller. It has been found that the stress sensor need not be a single material unitary body as shown in that patent if a joint between the semiconductor diaphragm and the support flange is formed by a strong bond.

Costs decrease if semiconducting material diaphragm-support structure units can be produced in a batch fabrication process. Uniformity of performance is also improved.

An object of this invention then is to provide a method to fabricate such stress sensors in a batch.

SUMMARY OF THE INVENTION

Two wafers of semiconducting material are prepared, one to a condition for forming diaphragms and the second wafer to a condition satisfactory for bonding the second wafer to the first wafer. The second wafer may also have holes through it for providing access to the diaphragms. The two wafers are then bonded together such that any holes through the second wafer substantially overlap prepared diaphragms in the first wafer. The joined wafers are then partitioned into elements each containing a recess and any associated access hole.

BRIEF DESCRIPTION OF THE DRAWING

FIGS. 1 through 6 are a diagrammatic showing of results obtained after accomplishing steps of the method of this invention to batch fabricate semiconductor stress sensors.

DESCRIPTION OF THE PREFERRED EMBODIMENTS

FIG. 1B shows a portion of a surface, $1a$, of a first wafer of semiconductor material, 1. a section line 1A is shown on the surface. The section corresponding to section line 1A is shown in FIG. 1A. The dashed lines shown in this Figure, such as dashed circular line $3c$ and dashed straight lines $3a$ and $3b$, are used to indicate the boundaries of surfaces $2a$ through $2n$ contained in major surface $1a$. The surfaces $2a$ through $2n$ represent a sample selection of surfaces to be constrained. These surfaces will be constrained by bonding support structures to them as discussed below. Each of these surfaces selected to be constrained surrounds a further surface such as that contained within dashed circular line $3c$ of FIG. 1B through which recesses will be made. The remaining material after recessing forming the bottom of a recess serves as a diaphragm. A typical thickness of this first wafer would be 8 mils.

As a first step in the method, sets of electrical elements for each diaphragm, such as diffused resistors, may be formed by standard techniques at major surface $1b$ in wafer 1. Each set is to be formed at an area of surface $1b$ that would be enclosed by projecting circular dashed line boundaries such as $3c$ in surface $1a$ through wafer 1 onto surface $1b$. The section 2A view shown in FIG. 2A shows several of these sets of electrical elements identified $7a$, $7n$, $7i$ and $7j$ formed through surface $1b$.

The second step is to mask major surface $1a$ of wafer 1. This is followed by the third step of exposing surface $1a$ within the dashed circular line boundaries such as $3c$ shown in FIG. 1B. These exposures are shown in FIG. 2B as $6a$ through $6n$. A section view of some of these exposures identified as $6a$, $6n$, $6i$ and $6j$ are shown in the section view 2A of FIG. 2A. Surfaces $2a$ through $2n$, now shown masked in FIG. 2B, are redesignated $2a'$ through $2n'$. If the bonding of the two wafers discussed below is to be done by forming an eutectic bond then the masking material 5 must be capable of forming an eutectic bond with the material of wafer 1. For this bonding method, a choice of material is silicon for wafer 1 and gold chrome for masking material 5.

The fourth step is to form recesses in the semiconductor material of wafer 1 at locations of the exposures $6a$ through $6n$. The results are shown in FIG. 3B as recesses $8a$ through $8n$. The recesses may be formed by any of several techniques such as machining or etching. If the masking material 5 is gold chrome or another material which will resist an etching agent that is capable of etching away the material of wafer 1, recesses $8a$ through $8n$ are easily formed by etching. The remaining material between major surface $1b$ and the bottom surfaces of the recesses $8a$ through $8n$ serves as diaphragms with a typical thickness of 2½ mils. These diaphragms resulting from the forming of recesses are shown in four instances $8a$, $8n$, $8i$ and $8j$ in the section view 3A of FIG. 3A. It is clear that the first step in this method, i.e., forming the circuit elements, could defer until after this recess forming step. This is to say electrical element sets $7a$ through $7n$ may be formed after recesses $8a$ through $8n$ are formed. It is also clear that the electrical element set $7a$ through $7n$ could be formed at the bottom surfaces of the recesses $8a$ through $8n$ rather than where shown in the section views of FIGS. 2A and 3A.

The second, third and fourth steps clearly may be entirely omitted if wafer 1 is sufficiently thin for the material within the dashed circular lines such as $3c$ to serve as satisfactory diaphragms. This could be accomplished by using a thin wafer from the beginning. A thicker wafer may be used if, after it is bonded to a second wafer as discussed below, the wafer thickness is reduced such as by etching or machining.

A second wafer for the support structure consisting of the same semiconducting material as in wafer 1 and containing access holes 12a through 12n in locations corresponding to the recesses in wafer 1 is shown finished in a portion of the wafer in FIG. 4B. It may be formed, as discussed in the following, nearly as is wafer 1. FIG. 4B shows surfaces 11a' through 11n' corresponding to surfaces 2a' through 2n' as would be marked out if wafer 1 was placed against wafer 2 and the boundaries of surfaces 2a' through 2n' were projected onto wafer 2. With wafer 2 positioned against wafer 1 in the above correspondence, the cross-section of access holes 12a through 12n at masked surfaces 10a would be substantially overlapped by the cross-section of recesses 8a through 8n at masked surface 1a. A typical thickness of wafer 10 is 20 mils.

The fifth step is to mask major surface 10a of wafer 10 with masking material 9. The sixth step surface 10a is exposed at the locations for the access holes indicated in the paragraph above. Again, if the bonding step discussed below consists of forming an eutectic bond, masking material 9 must be capable of forming an eutectic bond with the material of wafers 1 and 10 and with the masking material 5.

The seventh step is forming access holes 12a through 12n in wafer 10. Again machining or etching are two of the several available techniques. Choosing a material for masking material 9 which will resist an etching agent that is capable of etching the material wafer 10 allows access holes 12a through 12n to be etched in wafer 10. Some of the access holes designated as 12a, 12n, 12i and 12j so formed are shown in the section view of FIG. 4A. It is clear that the fifth step of masking wafer 10 may be omitted and replaced by other access hole locating methods when using other than etching techniques to form the access holes.

The result of the eighth step, butting a masked surface of wafer 1 against the masked surface of wafer 10 to form an interface, is shown in FIG. 5. The wafers 1 and 10 are positioned in the butting relationship such that points in the surfaces 2a' through 2n' are substantially adjacent to the corresponding points in the surfaces 11a' through 11n'.

Bonding together the wafers so butted above is the ninth step. Several bonding techniques will form a satisfactory joint. An eutectic bond which can be formed by standard techniques is particularly useful in this application since it is easily integrated with the etching techniques indicated above. As mentioned, masking materials 5 and 9 can be gold chrome and semiconducting material wafers 1 and 10 may be silicon.

It is clear that wafer 10 could also be joined to wafer 1 at surface 1b had the masking and etching occurred at major surface 10b rather than at major surface 10a. It further is clear that the forming of access holes through wafer 10 could be deferred until after bonding. The holes could then be machined in wafer 10 at the completion of bonding. Alternatively, the forming of diaphragms by recessing may be deferred until after bonding. Then the recessing may be accomplished using etching or machining techniques either through the unbonded surface of wafer 1 or through the bonded surface by operating through the access holes in wafer 2. Also it can be seen that with recesses through the bonded surface no access holes need be formed completely through wafer 10 at all if the wafers 1 and 10 are bonded together in a vacuum. In that circumstance an absolute pressure gauge will have been fabricated. If the pressures which such a gauge is to measure are large compared to atmospheric pressure, as a practical matter it is unnecessary to bond in a vacuum to effect a satisfactory gauge.

The tenth step is partitioning the now rigidly joined wafers along surfaces containing both the lines such as 14a, 14b and 14c shown in FIG. 5 and the boundaries shown as dashed straight line boundaries in FIG. 1B such as 3a and 3b. The resulting individual stress sensor elements are shown in FIG. 6. The partitioning may be effected by alternative methods such as by sawing apart the elements. It is clear that some of the partitionings along some of the boundaries shown as dashed straight line boundaries may be omitted to form multiple diaphragm units. It is also clear that wafer 1 can be partitioned at the end of the seventh step. Then corresponding pieces resulting from each of the partitionings can be bonded to make a stress sensor at a time that has had its two subcomponents batch fabricated.

As has been shown in the preceding, some steps can occur alternatively at different points in the process. Such reorderings do not represent inventions differing from the invention disclosed in the specification and the claims.

The embodiments of the invention in which an exclusive property or right is claimed are defined as follows:

1. A method for batch fabricating semiconductor material stress sensors comprising:
    forming diaphragms by recessing at selected locations through a first major surface of a first wafer of said semiconductor material,
    forming electrical elements in said diaphragms,
    bonding a second wafer of said semiconductor material to said first wafer, and
    partitioning said joined wafers to form said stress sensors.

2. The method of claim 1 wherein said bonding is accomplished by:
    forming access holes through said second wafer located to correspond to said diaphragms in said first wafer, and
    bonding said wafers together such that said access holes substantially overlap said diaphragms.

3. The method of claim 1 wherein said bonding is accomplished by:
    bonding said second wafer to said first wafer, and
    forming access holes through said second wafer located to correspond to said diaphragms in said first wafer.

4. The method of claim 1 wherein said forming of diaphragms is accomplished by:
    masking said first major surface of said first wafer with a first masking material which resists a first selected etching agent,
    exposing said first major surface at said selected locations, and
    applying said first etching agent capable of etching said semiconductor material to said masked and exposed first major surface until said recesses are formed.

5. The method of claim 1 wherein said forming of diaphragms is accomplished by machining.

6. The method of claim 1 wherein said forming of electrical elements is accomplished through a surface of said diaphragms defining the depth of said recesses.

7. The method of claim 1 wherein said forming of electrical elements is accomplished through a surface of said diaphragms opposite a surface defining the depth of said recesses.

8. The method of claim 1 wherein said bonding is accomplished with said second wafer attached to said first major surface.

9. The method of claim 2 wherein said forming of access holes is accomplished by:
   masking a second major surface of said second wafer with a masking material which resists a selected etching agent,
   exposing said second major surface at said corresponding locations, and
   applying said etching agent capable of etching said semiconductor material to said masked and exposed second major surfaces until said access holes are formed.

10. The method of claim 2 wherein said forming of access holes is accomplished by machining.

11. The method of claim 2 wherein said bonding is accomplished with said second wafer attached to a surface of said first wafer on the side opposite said first major surface.

12. The method of claim 4 wherein said bonding is accomplished by:
   using as said masking material a material capable of forming an eutectic bond between surfaces of said semiconducting material, and
   attaching said second wafer to said recessed first major surface by an eutectic bond.

13. The method of claim 4 wherein said forming of access holes and said bonding is accomplished by:
   masking said second major surface of said second wafer with a second masking material which resists a second selected etching agent,
   exposing said second major surface at said corresponding locations,
   applying said second etching agent capable of etching said semiconductor material to said masked and exposed second major surface until said access holes are formed,
   using as said first and second selected masking materials those materials capable of forming an eutectic bond between surfaces of said semiconducting material masking with either said first or second selected masking materials, and
   attaching said second wafer to said recessed first major surface by an eutectic bond.

14. The method of claim 9 wherein said bonding is accomplished by:
   using as said masking material a material capable of forming an eutectic bond between surfaces of said semiconducting material, and
   attaching said first wafer to said second major surface with said access holes by an eutectic bond.

15. A method for batch fabricating semiconductor material stress sensors comprising:
   forming sets of electrical elements in a first wafer of said semiconductor material at selected locations through a first major surface of said first wafer,
   forming diaphragms each containing a said set of electrical elements by recessing through a second major surface of said first wafer opposite said first major surface,
   bonding a second wafer of said semiconductor material to said first major surface, and
   partitioning said joined wafers to form said stress sensors.

16. A method for batch fabricating semiconductor material stress sensors comprising:
   forming diaphragms by recessing at selected locations through a first major surface of a first wafer of said semiconductor material,
   forming electrical elements in said diaphragms,
   partitioning said first wafer into individual diaphragms,
   partitioning a second wafer of said semiconductor material into pieces corresponding to said individual diaphragms, and
   bonding said individual diaphragms and said corresponding pieces together.

* * * * *